United States Patent [19]

Birkner

[11] 4,406,790

[45] Sep. 27, 1983

[54] METHOD FOR OPERATING A BIOLOGICAL SEWAGE PURIFICATION PLANT

[75] Inventor: Andreas Birkner, Bochum, Fed. Rep. of Germany

[73] Assignee: DR. C. Otto & Comp. G.m.b.H., Bochum, Fed. Rep. of Germany

[21] Appl. No.: 396,940

[22] Filed: Jul. 9, 1982

Related U.S. Application Data

[63] Continuation of Ser. No. 262,040, May 11, 1981, abandoned.

[51] Int. Cl.³ .............................................. C02F 3/16
[52] U.S. Cl. .................................. 210/612; 210/614; 210/177; 261/130
[58] Field of Search .............. 210/612, 613, 614, 628, 210/177–179, 219, 198.1, 600, 601; 159/1 RW; 261/119 R, 127, DIG. 76, 91, 141, 131, 130

[56] References Cited

U.S. PATENT DOCUMENTS

| 3,715,304 | 2/1973 | Hefermehl | 210/612 |
| 3,824,186 | 7/1974 | Erickson et al. | 210/612 |
| 4,000,064 | 12/1976 | Romell et al. | 210/612 |

*Primary Examiner*—Benoît Castel
*Attorney, Agent, or Firm*—Thomas H. Murray

[57] ABSTRACT

A method and apparatus for operating a biological sewage purification plant wherein the water to be treated is aerated in a tank containing bacteria by means of a rotating impeller or the like, characterized in that a heating medium, preferably steam, is fed onto the surface of the water to maintain it at the optimum temperature for facilitating decomposition by bacteria without excessive heating and resultant destruction of the bacteria.

4 Claims, 1 Drawing Figure

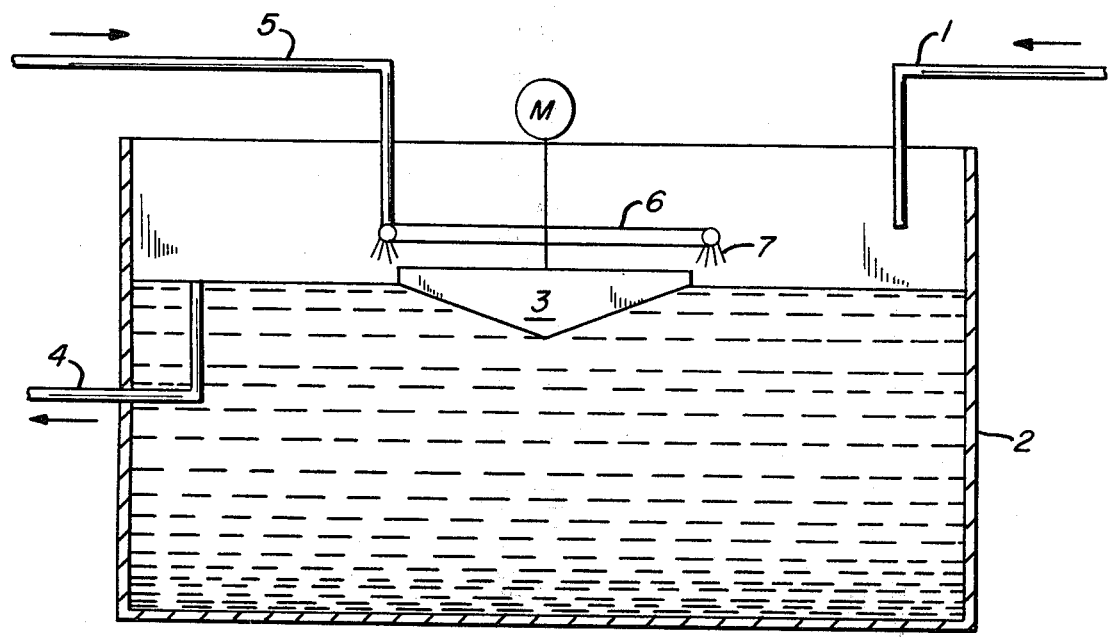

METHOD FOR OPERATING A BIOLOGICAL SEWAGE PURIFICATION PLANT

This is a continuation of application Ser. No. 262,040, filed May 11, 1981, now abandoned.

BACKGROUND OF THE INVENTION

As is known, biological sewage purification plants have been provided wherein the water to be treated is aerated in a tank containing bacteria by means of an aerating device which is preferably arranged in the region of the liquid level in the tank. The sewage is drained from the tank after a certain period of time during which it is aerated and exposed to the action of the bacteria. The oxygen necessary for maintaining and multiplying the strain of bacteria is supplied by means of an aerating device which preferably consists of a rotating impeller which constantly swirls the surface of the water to be treated such that it is enriched with air which permeates the entire contents of the tank. Other types of aerating systems, however, may also be employed.

In the operation of a sewage purification plant of this type, it is necessary to hold the temperature in the aerating tank at the optimum point which insures the best level of decomposition by the bacteria, irrespective of the external temperature which happens to prevail and of the inlet temperature of the water to be treated. If this temperature is not maintained, a considerable reduction in efficiency of decomposition occurs, particularly when the external temperature drops markedly. On the other hand, when the temperature is too high, efficiency may decline to almost a zero value.

In the past, proposals have been made for arranging heat exchange surfaces in the aerating tank itself or for introducing direct steam in order to heat up the contents of the tank when the external temperature falls. It has been found, however, that with heat exchange surfaces or direct introduction of heat, the temperature-sensitive bacteria, which come into contact with the heat exchange surfaces or the steam, will die. Also, it has been found necessary to subject the heat exchange surfaces to frequent cleaning due to heavy deposits of sludge with the overall result that this method has proved to be impractical.

Heating the incoming sewage and/or the return sludge before entry into the tank has likewise proved to be unsuitable because of local overheating inside the tank or at the heat exchange surfaces which results in the death of the bacteria. In addition, rather large amounts of sewage must be heated and supplied to the tank to maintain the desired temperature. Such large amounts of sewage do not insure the proper dwell time of the sewage in the tank to facilitate bacterial growth. Furthermore, radiation losses at the surface of the water are too high.

SUMMARY OF THE INVENTION

In accordance with the present invention, the foregoing problems of operating a biological purification plant are obviated such that optimum bacterial growth and decomposition conditions exist in the aerating tank at all times of the year irrespective of the external ambient temperature. This is achieved by feeding a heating medium, preferably steam, onto the surface of the sewage present in the tank such that the steam is distributed as uniformly as possible over the entire surface of the sewage. The amount of heating medium supplied is metered in dependence upon the temperature of the water in the aerating tank.

Preferably, the means for supplying steam onto the surface of the sewage comprises an annular distributor pipe located above an aerating impeller and provided with orifices which direct the steam onto the surface of the sewage. It has been found in carrying out the method of the invention that the heating medium, preferably steam, applied to the surface of the water accumulates like a layer of mist above the surface and that in spite of the existence of cold ambient air, the contents of the tank undergo practically no cooling.

The above and other objects and features of the invention will become apparent from the following detailed description taken in connection with the accompanying single FIGURE drawing which forms a part of this specification.

With reference now to the drawing, the sewage to be aerated passes through a conduit 1 into an aerating tank 2 and is aerated by means of a rotating impeller 3 driven by a motor M. The impeller rotates at the surface of the water contained in the tank and produces a whirling and circulatory motion of the water to be treated such that it is enriched with air which permeates the entire contents of the tank. The treated sewage passes out of the tank via an overflow conduit 4.

In accordance with the invention, a heating medium, preferably steam, is supplied through conduit 5 to an annular distributor ring 6 provided with downwardly-directed orifices which produce steam jets 7. In the embodiment illustrated, the distributor ring is mounted concentrically with the aerating impeller 3 and is arranged at a suitable height above the water level. In this manner, uniform distribution of the heating medium over the entire surface of the water takes place.

A plurality of distributing devices may also be provided in one aerating tank. Alternatively, a plurality of aerating tanks such as aerating tanks arranged side-by-side can be used. The amount of heating medium supplied to effect a suitable optimum tank temperature for bacteria growth can be controlled either manually or automatically in response to the temperature of the sewage within the tank. With the arrangement shown, the steam will accumulate as a layer above the surface of the sewage and prevent radiation and convection losses at the surface of the water. At the same time, the aerating medium, which passes through the layer of steam, is heated and this heat is transferred to the sewage within the tank.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A method for operating a biological sewage purification plant, comprising the steps of aerating the sewage within the tank, and from a location above the surface of sewage in the tank directing onto said surface but not beneath said surface a heating medium which forms a blanket over the surface and which maintains the temperature of the sewage at a point which will promote optimum bacterial growth.

2. The method of claim 1 wherein the heating medium is steam.

3. The method of claim 1 wherein the amount of heating medium supplied to the surface of the sewage is controlled as a function of the temperature of the sewage.

4. The method of claim 1 wherein the sewage is aerated by producing a swirling motion at the surface thereof.

* * * * *